United States Patent [19]

Rassi et al.

[11] 3,759,121

[45] Sept. 18, 1973

[54] APPARATUS FOR SKIVING REINFORCED HYDRAULIC HOSE

[75] Inventors: Christian A. Rassi, Morton; Lyonell P. Dick, East Peoria, both of Ill.

[73] Assignee: Caterpillar Tractor Co., Peoria, Ill.

[22] Filed: Dec. 20, 1971

[21] Appl. No.: 209,628

[52] U.S. Cl. .................................. 82/20 R, 82/4 R
[51] Int. Cl. ........................... B23b 5/00, B23b 5/04
[58] Field of Search ...................... 82/20, 4; 81/9.51

[56] References Cited
UNITED STATES PATENTS

| | | | |
|---|---|---|---|
| 3,354,762 | 11/1967 | Wolff | 82/4 R |
| 2,641,944 | 6/1953 | Laffoon | 81/9.51 R |
| 2,348,186 | 5/1944 | Bashore | 82/4 R X |
| 3,577,813 | 5/1971 | Vorantsov | 81/9.51 R |
| 2,300,967 | 11/1942 | Reed et al. | 82/20 R |
| 3,303,732 | 2/1967 | Gill | 82/4 R |
| 3,379,080 | 4/1968 | Massa | 82/4 R |

*Primary Examiner*—Harrison L. Hinson
*Attorney*—Warren J. Krauss et al.

[57] ABSTRACT

A portable, self-contained machine for skiving reinforced hose fixedly held in position by a mandrel while a rotary cutting assembly moves longitudinally along the portion of the hose which is to be skived. A pair of cutting members are held in tool blocks in the cutting assembly and are positioned on diametrically opposite sides of the mandrel and are in parallel alignment. The tool blocks can be advanced to a point of contact with a stop member which abuts an outer diameter of a collar portion of the mandrel. A spring system forces the cutting members against the reinforced hose until contact is made with a stop member. The cutting edges of the cutting members are displaced slightly ahead of the plane of the reinforced portion of the hose to permit a heel portion only of said cutting members to ride upon the surface of the reinforced hose when the hose has been skived in order to prevent the cutting edge from damaging the reinforced portion of the hose when an oversized diameter reinforced hose is encountered. Opposite sides of said cutting edges are chamfered to assist the cutting edge in biting radially into the outer resilient covering and to produce a chamfered edge on the resilient outer covering which remains on the unskived portion of the reinforced hose.

12 Claims, 6 Drawing Figures

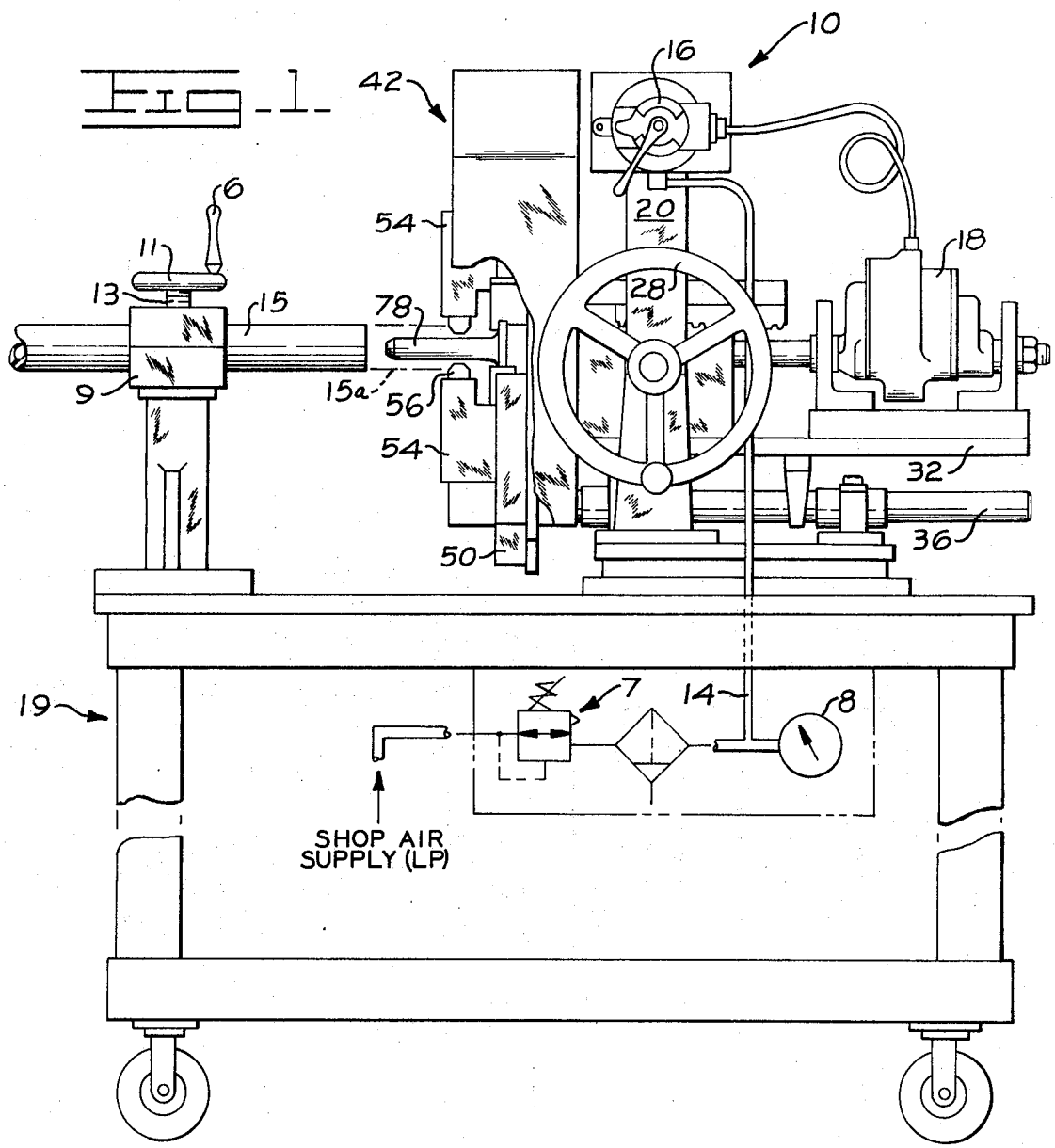

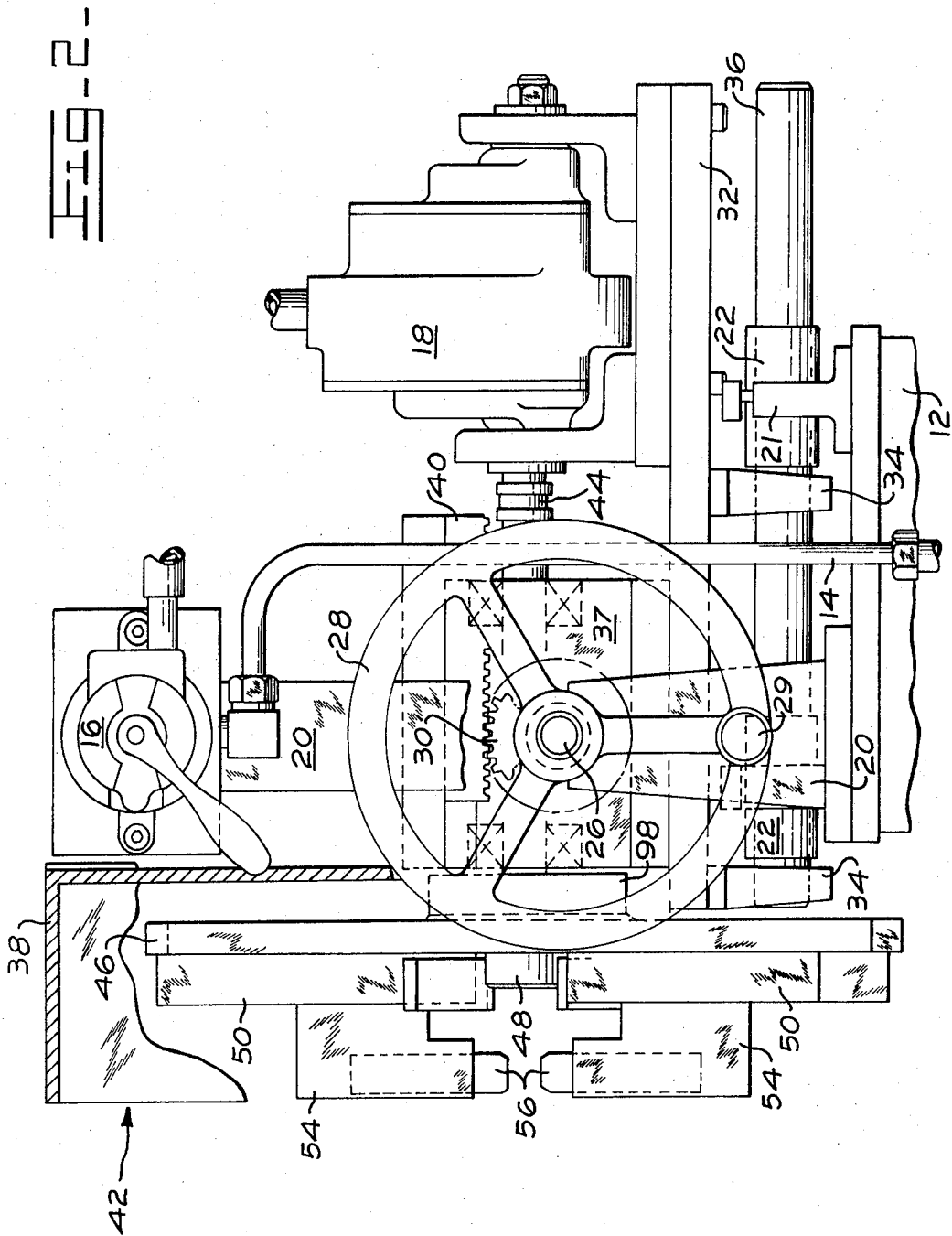

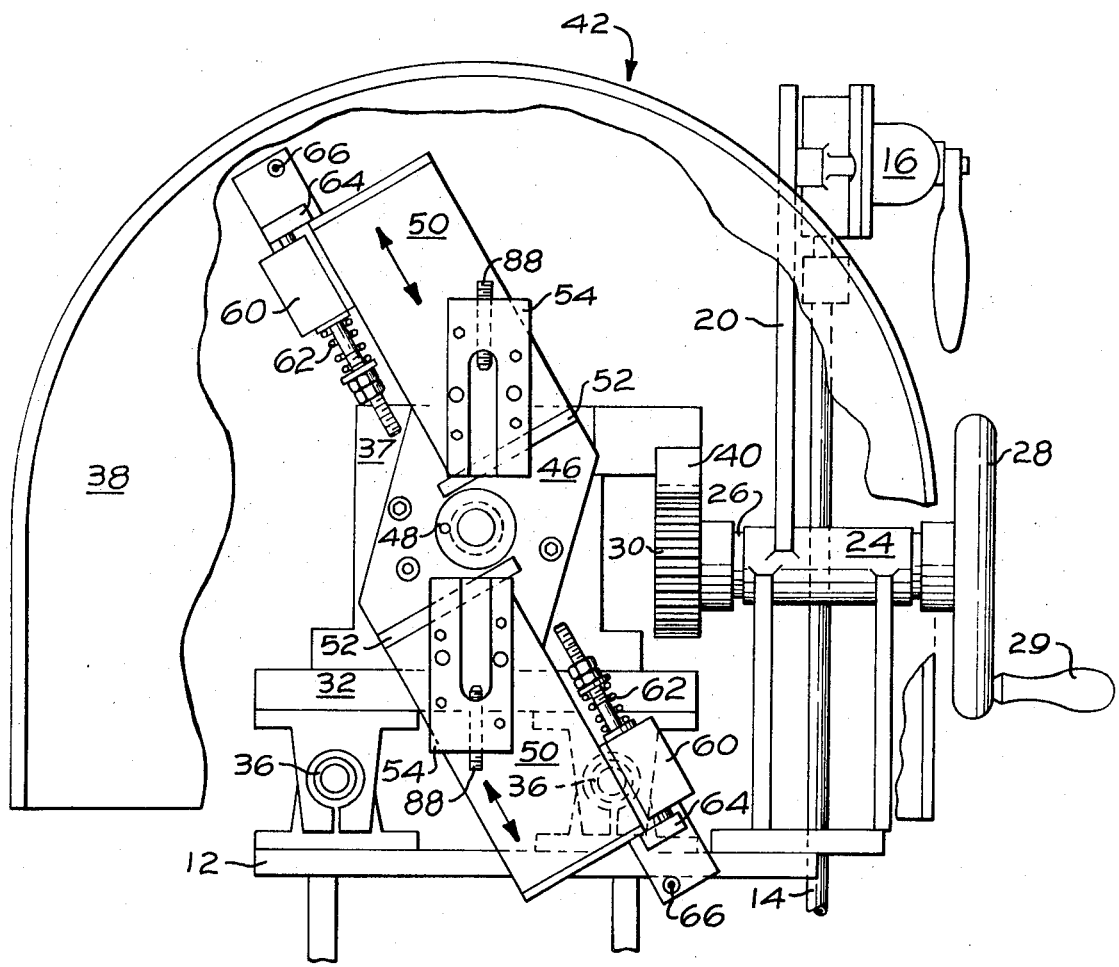
Fig_3_

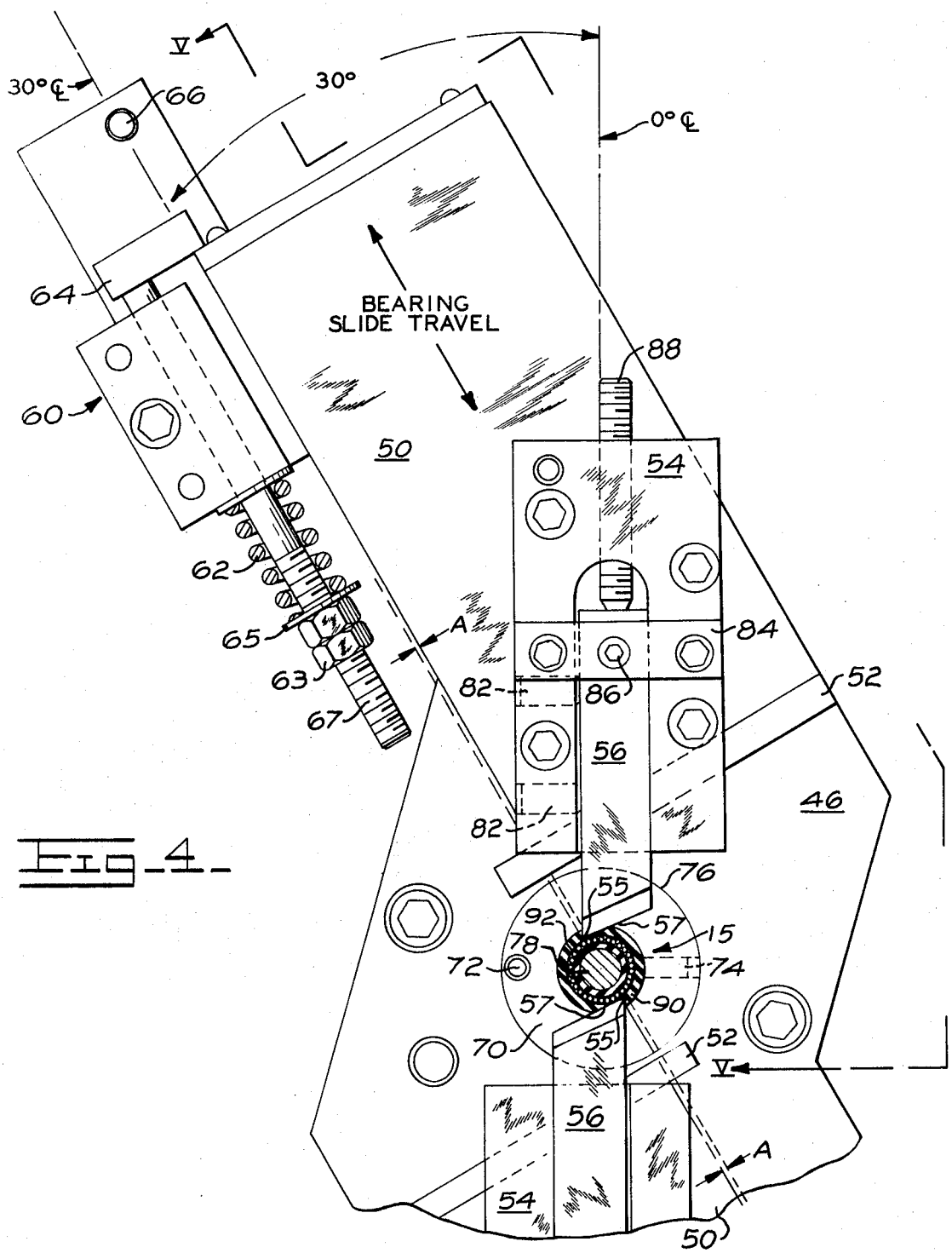

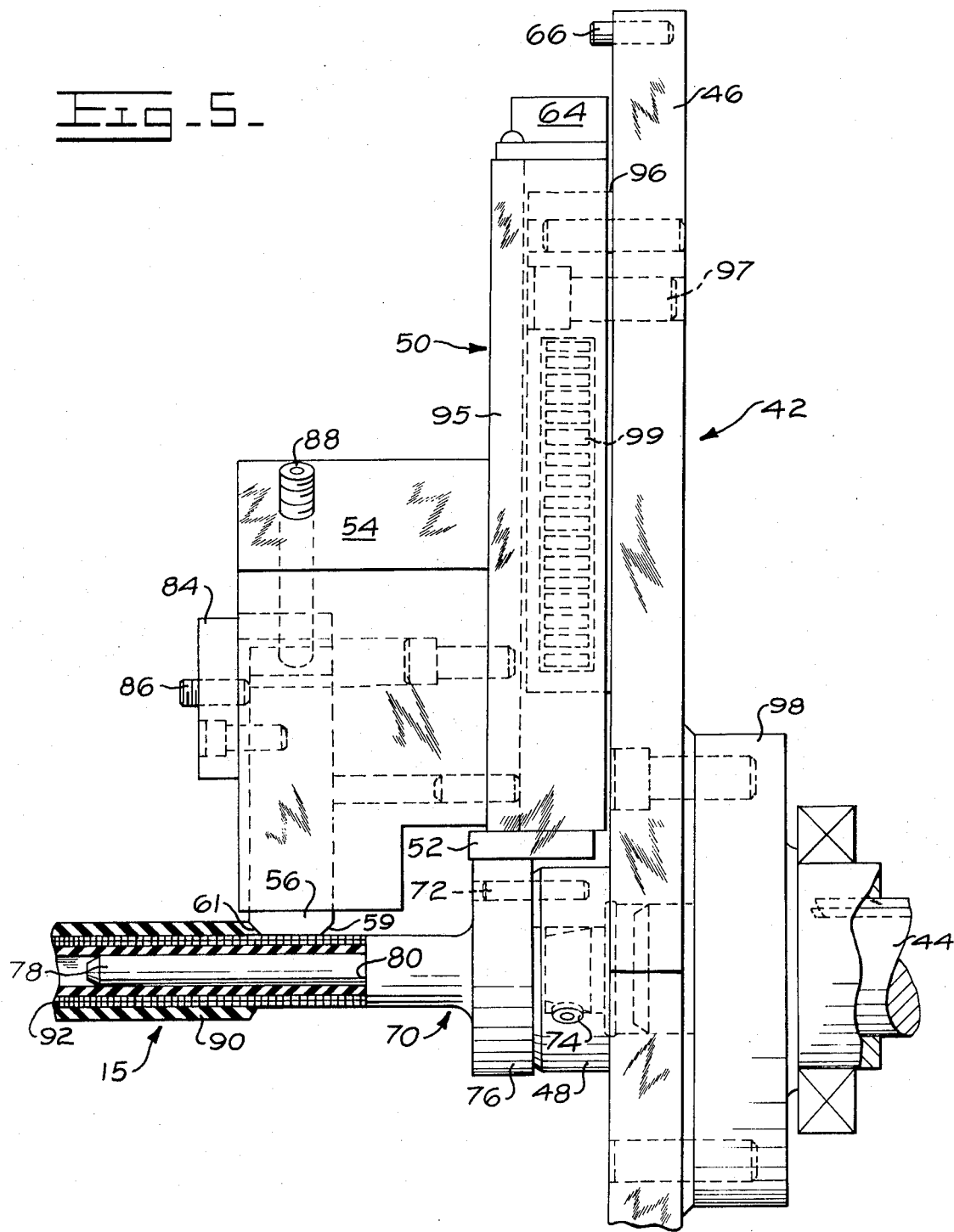

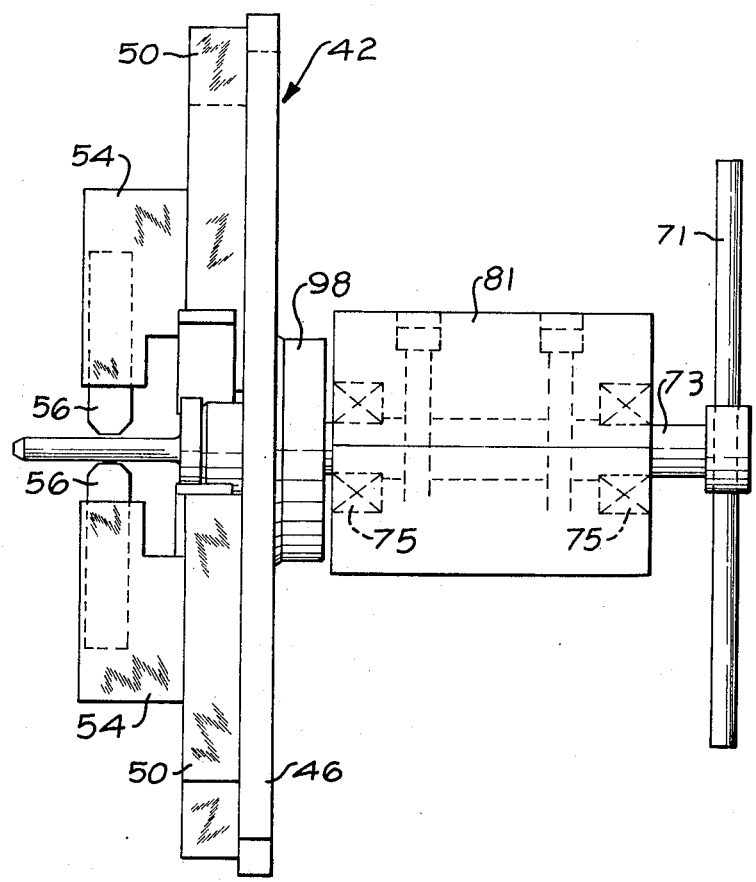

APPARATUS FOR SKIVING REINFORCED HYDRAULIC HOSE

BACKGROUND OF THE INVENTION

This invention relates to a machine for removing the outer resilient covering from reinforced hose and, more particularly, it relates to a portable and self-contained machine for skiving the outer rubber layer from an end portion of a reinforced rubber hose.

The traditional method for skiving such hose has been to grind away the outer covering therefrom by means of wire brushes or the like. Such grinding operations usually create dust which must be collected and disposed of to protect factory workers from dangerous inhalation injuries. The skived hose must also be cleaned, both externally and internally, before an end fitting can be attached. In addition, wire brush skivers do not provide a regular chamfered edge on the prepared hose which is suitable for attachment to an end fitting. Also, wire brushes must be rotated at extremely high speeds so that centrifugal force can assist in maintaining the brush bristles rigidly straight. Therefore, high speed motors, usually hydraulically-actuated, and the problems attendant to the operation thereof are encountered.

Knife-type strippers have also been employed to strip the outer resilient covering from reinforced hose. These have incorporated fixed-position cutting blades and have required the rotation of the reinforced hose which is being prepared. The fixed setting of the knives renders them incapable of compensating for larger or smaller diameter hoses within a given range of tolerance. Thus, unless perfectly uniform hose is skived conventional knife operations result in the retention of an unwanted portion of the resilient covering on the hose or in damage to the reinforcing layer by the knives. Also, rotation of the hose to meet the knives introduces a twist in the hose which is undesirable and can subject the hose to harmful torsional stresses. Additionally, known existing knife strippers must be attached to a fixed source of rotary movement such as a lathe so that it is impractical to employ them in field operations. Finally, knife strippers which work inwardly from an end of a hose can become entangled in stray ends of reinforcement material and can damage the reinforcing layer of the hose.

It is an object of this invention to provide a machine which can strip the outer resilient covering from an end portion of a piece of reinforced hose and which can remove substantially all of such covering without damaging the reinforcing layer.

A further object of this invention is to provide a machine for skiving the outer resilient covering of a reinforced hose without requiring the rotation or twisting of said hose.

A still further object of this invention is to provide a machine which skives the outer resilient covering from a reinforced hose in a manner which leaves a uniform chamfered edge on the resilient covering of the unskived portion of the hose to permit an end fitting to be attached theretowith a tight fit and minimal stress concentrations.

Another object of the present invention is to provide a machine for stripping the outer resilient covering from a reinforced hose without the creation of dust particles.

An additional object of this invention is to provide a machine which can strip the outer resilient covering from an end portion of a reinforced hose when stray ends of the reinforcing material are present due to an uneven severance of the hose without having portions of the machine become entangled in such reinforcing material.

It is a final object of this invention to provide a machine for skiving the outer resilient covering from an end portion of a reinforced hose which machine is portable and self-contained so that it can be readily transported to the location of the hose which is to be prepared.

Other objects and advantages of the present invention will become apparent from the following description and claims.

BRIEF DESCRIPTION OF THE DRAWINGS

FIG. 1 is a side elevational view of the machine of the present invention which illustrates generally the hose retaining means, the rotary cutting assembly, the mandrel, the means for longitudinally adjusting rotary cutting assembly and the drive means for the machine;

FIG. 2 is an enlarged side elevational view of a portion of the machine shown in FIG. 1;

FIG. 3 is a cut-away end view of the rotary cutting assembly particularly illustrating the tool blocks, slide means and spring tension means;

FIG. 4 is an enlarged end view of a portion of FIG. 3;

FIG. 5 is a cross-sectional elevational view of a reinforced hose in place on the mandrel, and an elevational view of a portion of the rotary cutting assembly; and FIG. 6 is a side elevational view of a manually-operated embodiment of the machine of the present invention.

SUMMARY OF THE INVENTION

The instant skiving machine quickly, cleanly and accurately skives the outer resilient covering from reinforced hose so that a hose coupling or end fitting may be placed upon a stripped portion of the hose. In operation, an end portion of the reinforced hose is placed over a fixed-position mandrel in abutment with a pilot member. The reinforced hose is securely held in this position by means of a retaining means. A rotary cutting assembly is rotated about and displaced longitudinally of said end portion of the hose. Cutting members disposed within the rotary cutting assembly bite into and strip away the outer resilient covering from the reinforced hose.

The machine is capable of conpensating, within a given range of tolerance, for the variations in the thickness of the outer covering which variations are encountered in mass-produced, reinforced hosing. Such compensation is accomplished by mounting the cutting members in tool blocks which are affixed to spring-loaded bearing slides so that the cutting edges of the cutting members ride slightly above the exterior surface of the resilient covering while the heel portions of such cutting members ride directly upon the exterior surface in a spring torsion ride. This differential spacing between the position of the cutting edge and that of the heel portion is minute. Therefore, as long as resilient material is encountered, the heel of the cutting member will be pressed into it so that the cutting edge will engage and strip the material. However, when the reinforcing layer or sheath is encountered, the heel portion will no longer press into the hose because of the non-resilient nature of such layer and the cutting edge will move no closer to the axis of the hose. A thin sheath of the resilient material equal in thickness to the just-mentioned differential spacing will be left on the reinforcing portion of the hose and the reinforcing portion will never be damaged by the cutting edge of the cutting member.

The differential spacing, with respect to the hose axis, between the cutting edge and the heel portion of the cutting member is obtained by positioning the cutting members in the rotary cutting assembly on opposite sides of the hose in parallel alignment with a reference diameter which passes through the mandrel and by attaching the cutting members to slide means whose direction of travel is advanced angularly ahead of this reference diameter in the direction of rotation of the rotary cutting assembly. The particular configuration of the cutting members will depend upon the degree of angular advancement and differential spacing desired.

A minimum cutting diameter for the cutting members is defined by stop members which are attached to a portion of the slide means in such a manner that they abut the outer diameter of a collar on a fixed-position pilot member mounted upon the mandrel. The definition of a minimum diameter is desirable since, in practice, the hoses skived will be of a uniform diameter and a swift cutting stroke, wherein the stop members abut the collar and the cutting members dig cleanly and swiftly into the outer resilient covering material, is desirable. The aforementioned action of the heel portion of the cutting member in preventing the cutting edge from scraping or cutting the reinforcing portion of the hose is very important when oversized hose diameters are encountered and a set minimum diameter is defined by the collar portion.

The opposite sides of each cutting member are chamfered to facilitate the bite of the cutting edges into and along the outer resilient covering. The chamfered sides closest to the resilient covering remaining unskived leave a chamfered edge thereupon which permits the stripped or skived end to be coupled to a fitting with a very close fit and which enhances stress relief at the junction between the material and the fitting.

DETAILED DESCRIPTION

Referring now to FIG. 1, it can be seen that a reinforced hose 15 may be fed to the machine through a bore in a block 9, which block is in axial alignment with a mandrel 78. A reinforced hose 15 is fitted over the end of the mandrel to occupy the position shown in phantom at 15a. As shown clearly in FIG. 5, the end of the reinforced hose abuts a stop face 80 of a pilot member 70.

Referring again to FIG. 1, a handle 6 is manipulated to rotate a wheel 11 which wheel tightens a variable screw 13 to secure the reinforced hose 15 in a fixed position. A rotary cutting assembly shown generally at 42, is then rotated while simultaneously being moved longitudinally along the axis of reinforced hose 15 to strip a selected length of the outer resilient covering therefrom.

The rotation of rotary cutting assembly 42 is achieved by means of a fluid motor 18 which is activated by opening a manual valve 16 to admit a supply of compressed air or other fluid introduced by a conduit 14 from a standard source at 10. It can be seen that the compressed air is fed through a pressure regulating and filtering apparatus shown generally at 7 before it reaches the conduit 14 to assure the smooth and steady operation of the motor 18 and thus the smooth and steady skiving of the reinforced hose. A pressure readout gage 8 permits the operator to monitor the air introduced through conduit 14.

The mobility of the present invention is evidenced by its placement on a cart 19, which cart can be readily transported to the location of the reinforced hose 15 to be prepared. Bench models, of course, can also be built within the spirit of the invention.

The ability of the rotary cutting assembly 42 to be moved longitudinally along the reinforced hose is illustrated most clearly in FIG. 2. A shaft 44 extends from the motor 18 through a slideable bearing block 37 and is attached to the rotating cutting assembly by means of the fixture member 98. A handwheel 28 is mounted upon a stanchion 20 by means of a shaft 26 and the stanchion 20 is affixed to fixed horizontal base 12. When the handwheel 28 is turned by means of a handle 29, torque is transmitted to a rotary pinion gear 30. A bearing sleeve 24, shown in FIG. 3, separates the handwheel 28 from the rotary drive pinion 30. The pinion engages a rack 40 which converts the rotation into a linear movement, as shown clearly in FIG. 2. The rack moves slideable bearing block 37 and the motor 18 forwardly or backwardly and causes the rotary cutting assembly 42 to move longitudinally with respect to the reinforced hose axis. Smooth longitudinal movement is achieved by means of the movement of a slideable base 32 in conjunction with longitudinal bars 36 which are disposed within the circular bearing blocks 22. The slideable base 32 is integrally connected to clamps 34 which clamp onto the bars 36. Circular bearing blocks 22 are affixed to the base 12 by means of stanchions 21.

The spring torsion ride of a heel portion 57 of a cutting member 56 upon the resilient outer covering 90 of the reinforced hose 15 is best shown in FIGS. 4 and 5 to be produced by the variable forces exerted by a spring 62 against a plate 65 which forces are determined by the setting of an adjustable lock nut 63 on a threaded plunger shaft 67 and transmitted by a plunger member 64 to a bearing slide 50.

A cutting edge 55 is positioned slightly above the heel portion 57 as shown in FIG. 4, so that the heel portion encounters the reinforced hose first as the cutting member is moved radially inwardly. A differential spacing of approximately 1/32 inch has been found to be satisfactory. That is, when heel portion 57 rests upon the outer covering 90, the cutting edge 55 is 1/32 inch above the covering 90 in the direction of travel of bearing slide 50. This spacing is shown as dimension A in FIG. 4. Unless the reinforcing sheath portion 92 of the hose 15 is reached by heel portion 57, the force exerted by the spring 62 will either hold the stop member 52 of bearing slide 50 against the outer diameter collar 76 of a pilot member 70, thereby producing the desired cut, or will press the heel portion further into the outer resilient covering 90 so that the cutting edge 55 will continue to cut. If heel portion 57 reaches the reinforcing sheath 92, then the radially inward travel of the cutting member 56 will cease. A force will be exerted upwardly upon heel portion 57 which will be transmitted to the tool block 54 so that a component of such force will move the bearing slide 50 against the plunger 64 to counteract the tension force exerted by spring 62. Radially outward movement of plunger 64, and thus the maximum diameter of hose which can be accommodated, is limited by means of a fixed dowel 66. A guard member 38 protects workmen from injury.

Movement of the bearing slide 50 is achieved concurrently with movement of a movable portion 95 with respect to a base portion 96, as shown in FIG. 5. Roller bearings 99 are fitted into complementary channels in the movable portion and the base portion. Base portion 96 is affixed to spindle mounting plate 46 by means of dowels 97. Spindle mounting plate 46 is, in turn, mounted upon a fixture member 98 to which the shaft 44 is keyed.

The direction of movement of bearing slides 50, as shown in FIG. 4, is advanced angularly ahead of the reference diameter established by the position of tool blocks 54 and cutting members 56. In this embodiment, the direction of travel of the bearing slides is advanced 30 degrees counterclockwise, i.e., the direction of rotation, and the configuration of cutting member 56 is fabricated to achieve the heel portion and cutting edge relationship described above. The degree of annular advancement will determine the shape and positioning of the cutting member as well as the strength of the compression spring employed.

Opposite side portions 59 and 61 of the cutting members 56 are chamfered to assist the bite of cutting edge 55 into the resilient outer covering 90. Chamfered side 61 also causes a chamfered edge to be left on the outer resilient covering which remains on the unskived portion of the hose. A 30° chamfer has been found to be satisfactory for side 61 while a 45° chamfer has been found to be most satisfactory for side 59. As a result of the chamfer formed on the resilient covering, a hose coupling or end fitting can be attached in a tight sealing fit and the junction between the resilient covering and the coupling or fitting is better able to withstand stresses.

The cutting members 56 are held within the tool blocks 54 by means of a keeper plate 84 having a set screw 86, as shown in FIG. 5, and by set screws 82, shown most clearly in FIG. 4. The cutting depth of cutting members 56 is determined by adjusting the screw 88. In practice, however, a single adjustment is maintained.

The pilot member 70 is affixed to the base 48 by means of a dowel 72 and by set screw 74. It is evident that cutting members 56 need not be adjusted to permit the skiving of the outer resilient layer from different sized reinforced hose. Rather, the pilot member 70 is appropriately changed so that the outer diameter of collar 76 will abut the stop member 52 at a given predetermined position to define a minimum cutting diameter for the cutting member 56 and also to predetermine the length of hose which is skived. When pilot member 70 is changed, the tension exerted by spring device 60 must also be adjusted to provide the proper inward bias on the cutting members.

In operation, the cutting members are positioned adjacent to the end of the reinforced hose to be skived and are moved longitudinally into engagement with the hose. In an alternate mode, especially useful in the end of the reinforced hose has not been cleanly severed, the rotary drive means is turned off and the cutting members, after being displaced radially outwardly, are moved over the surface of the reinforced hose for the maximum stripping length. This action is possible due to the spring action of the bearing slides. The rotary drive means is then activated and the rotary cutting assembly is moved longitudinally rearwardly toward the end of the hose. This latter technique avoids entanglement of the cutting members with any possible stray ends of the reinforcing material.

The present invention may also be embodied in a field skiving tool. FIG. 6 shows such a field machine which is hand operated and which can be mounted upon a work bench, sawhorse or other suitable temporary structure. This field machine is highly portable and is not dependent on electrical power, compressed air or the like. The end of a reinforced hose is placed over a tool mounted mandrel between the cutting members 56, as previously described, and is held in a fixed position. It is preferable to use a vise or wrench to hold the hose but, if necessary, the hose may be held by hand. The rotary cutting assembly 42 is attached to and rotated by a shaft 73 through a fixture member 98. Shaft 73 is turned by a handle 71 and is rotatable in bearings 75 within a bearing block 81. The torsion ride and minimum diameter features described above are also incorporated in this field skiving tool.

While the preferred embodiments of the instant skiving machine have been illustrated and described, it should be understood that these embodiments are capable of variation and modification and are not limited to the precise details set forth but rather include such modifications and variations as fall within the scope and spirit of the appended claims.

We claim:

1. A machine for skiving a reinforced hose which has a circular cross section and a reinforcing layer covered by a resilient layer, comprising; rotary means having an open central area for receiving said hose, drive means for rotating said rotary means, cutter means mounted upon said rotary means and extending radially outwardly of said hose on diametrically opposite sides thereof, travel means for moving said rotary means and cutter means simultaneously longitudinally of said hose while said drive means rotates said rotary means whereby said resilient layer is skived progressively longitudinally off of said hose, said cutter means including member means for sliding radially inwardly and outwardly of said hose along a line which runs parallel to a first radius of said hose and for moving along a line which runs parallel to a second radius of said hose which is different from said first radius of said hose.

2. The invention of claim 1 wherein gripping means are provided for holding said hose fixed against rotation while said rotary means moves longitudinally of and rotates about said hose.

3. A machine for skiving a reinforced hose which has a circular cross section and a reinforcing layer covered by a resilient layer, comprising; rotary means having an open central area for receiving said hose, drive means for rotating said rotary means, cutter means mounted upon said rotay means and extending radially outwardly of said hose on diametrically opposite sides thereof, travel means for moving said rotary means and cutter means simultaneously longitudinally of said hose while said drive means rotates said rotary means whereby said resilient layer is skived progressively longitudinally off of said hose, said cutter means including slide block means which are slidable radially inwardly and outwardly of said hose and which are mounted upon said rotary means, said slide block means being positively biased radially inwardly by biasing means, said cutter means further including a cutter member having an axis running parallel to a first radius of said hose, said cutter member being adjustably mounted upon a portion of said slide block means, said slide block means being slidable upon said rotary means along an axis of said slide block means which runs parallel to a second radius of said hose.

4. The invention of claim 3 wherein said second radius is advanced angularly approximately 30° ahead of said first radius in the direction of rotation of said rotary means.

5. The invention of claim 4 wherein said cutter member has a cutting edge portion and a heel portion and wherein said cutting edge portion is disposed above and away from said reinforcing layer of said hose when said heel portion is in contact therewith such that said cutting edge portion cannot cut said reinforcing layer.

6. The invention of cliam 3 wherein pilot means are provided for centering said hose with respect to said rotary means and wherein stop means are provided on said slide block means, which stop means engage a portion of said pilot means to preclude further inward movement of said slide block means.

7. A self-contained machine for skiving outer resilient covering from the reinforcing layer of a reinforced hose, comprising; frame means for supporting a bearing block having a shaft means extending therethrough, a rotary cutting assembly, including a spindle mounting plate attached to one end of said shaft means, a pair of spring loaded slide means affixed to said spindle mounting plate and positioned on opposite sides of an axis of said shaft means, said slide means being slideably movable and the direction of travel of said slide means being angularly advanced ahead of a reference line taken through said axis of said shaft means in the direction of rotation of said rotary cutting assembly, a pair of tool blocks affixed to said slide means and disposed in parallel alignment with said reference line of said shaft means, and a pair of cutting members mounted within said tool blocks and having a cutting edge portion and a heel portion, said cutting edge portion and heel portion being oriented so that said heel portion is slightly closer to said axis of said shaft means along said angularly advanced reference line than is said cutting edge portion, rotary drive means attached to the other end of said shaft means to rotate said rotary cutting assembly, mandrel means attached to said frame means in coaxial alignment with said shaft means and positioned between said cutting members, said mandrel means being disposed to accept an end of said reinforced hose; pilot members means insertable over said mandrel means and disposed to fit around said mandrel means in a fixed position at a junction of said mandrel means and said frame means, said pilot member means having an end stop face to abut said end of said reinforced hose, and axial displacement means attached to said frame means in functional cooperation with said rotary cutting assembly for moving said rotary cutting assembly longitudinally along the length of said mandrel.

8. The machine of claim 7 wherein said pilot member means has an outer collar portion which abuts stop plates attached to said bearing slides when said bearing slides reach their nearest approach to said mandrel means, said nearest approach defining a minimum cutting diameter for said cutting members.

9. The machine of claim 8 wherein said rotary drive means is an air motor which is moved by said axial displacement means in conjunction with said rotary cutting assembly.

10. The machine of claim 9 wherein said spring loaded slide means comprise, in combination; a rectangular bearing slide, an end of said bearing slide remote from said tool blocks driving a spring loaded plunger, said spring loaded plunger having an adjustable spring biasing means.

11. The machine of claim 10 wherein the sides of said cutting members are chamfered to facilitate the bite of said cutting edge into said resilient covering and to produce a chamfered edge on the resilient covering remaining on said hose.

12. A portable and self-contained machine for skiving the outer resilient covering from an end portion of a reinforced hose, comprising; bearing block means with shaft means extending slideably therethrough, a rotary cutting assembly, including a spindle mounting plate attached to one end of said shaft means, a pair of spring loaded slide means affixed to said spindle mounting plate and positioned on opposite sides of the axis of said shaft means, the direction of travel of said slide means being angularly advanced with respect to a reference radius of said axis of said shaft means in the direction of rotation of said rotary cutting assembly, a pair of tool blocks affixed to said slide means in parallel alignment with said reference radius of said shaft means, and a pair of cutting members inserted within said tool blocks and having a cutting edge and a heel, said cutting edge and said heel being oriented so that said heel is slightly closer to said axis of said shaft means along said angularly advanced radius than is said cutting edge, and mandrel means attached to said bearing block in coaxial alignment with said shaft means and positioned between said cutting members, and pilot member means inserted over said mandrel means and disposed to fit around said mandrel means in a fixed position at a junction between said mandrel means and said bearing block, said pilot member means having an end stop face to abut said end portion of said reinforced hose, and handle means attached to the other end of said shaft means for manually turning said rotary cutting assembly.

* * * * *